United States Patent [19]

Jatkar et al.

[11] 4,013,477

[45] Mar. 22, 1977

[54] METHOD FOR PREPARING DENSE, β-ALUMINA CERAMIC BODIES

[75] Inventors: Arun D. Jatkar; Ivan B. Cutler; Anil V. Virkar; Ronald S. Gordon, all of Salt Lake City, Utah

[73] Assignee: The University of Utah, Salt Lake City, Utah

[22] Filed: July 30, 1975

[21] Appl. No.: 600,260

[52] U.S. Cl. ................................ 106/73.4; 106/63; 106/65; 264/61; 264/66

[51] Int. Cl.[2] ........................................ C04B 35/10

[58] Field of Search ..................... 264/61, 66, 332; 106/63, 65, 73.4; 423/625

[56] References Cited

UNITED STATES PATENTS

| | | | |
|---|---|---|---|
| 3,265,466 | 8/1966 | Mollard | 423/625 |
| 3,795,723 | 3/1974 | Clendenen | 264/332 |
| 3,903,225 | 9/1975 | Jones et al. | 264/66 |
| 3,959,022 | 5/1976 | DeJonghe et al. | 264/66 |

*Primary Examiner*—Donald J. Arnold
*Assistant Examiner*—John Parrish
*Attorney, Agent, or Firm*—Clarence W. Martin

[57] ABSTRACT

A method for preparing a dense and strong polycrystalline β''-alumina-containing ceramic body exhibiting an elecrical resistivity at 300° C of 5 ohm-cm or lower, and a controlled and uniform grain size under 50 micrometers, comprising:

A. preparing fully converted β''-alumina seeds;
B. mechanically mixing in the above-mentioned β''-alumina seeds with a matrix powder of a composition consistent with the formation of β''-alumina upon sintering; and
C. sintering at about 1600° C for less than 10 minutes in an open-air atmosphere or under noble metal encapsulation, a green ceramic body formed from the powder mixture of which one ingredient is the β''-alumina seeds and the other ingredient is the matrix powder of a composition consistent with the formation of β''-alumina.

The polycrystalline β''-alumina-containing ceramic bodies obtained by the method of this invention exhibit high density, low porosity, high strength, fine grain size, and low electrical resistivity. Such polycrystalline β''-alumina-containing bodies are ideally suited for use as solid reaction zone separator or solid elecrolyte in certain electrical conversion devices.

4 Claims, No Drawings

METHOD FOR PREPARING DENSE, β-ALUMINA CERAMIC BODIES

The invention herein described was made in the course of or under a contract or subcontract thereunder with the National Science Foundation, and the latter is granted a royalty-free license to practice the invention in behalf of the government of the United States for the duration of any patent which may issue.

SPECIFICATION

This application relates to a method for preparing dense, strong, β''-alumina containing ceramic bodies having a low electrical resistivity. More particularly, this application relates to a method for preparing polycrystalline β''-alumina-containing bodies exhibiting low porosity, small grain size, near theoretical density and low electrical resistivity. Still more particularly, this application relates to a method for preparing polycrystalline β''-alumina-containing bodies which are ideally suited for use as reaction zone separators or solid electrolytes in certain electrical conversion devices.

Among the polycrystalline bi- or multi-metal columns which are most useful for use in electrical conversion devices, particularly those employing molten metal and/or molten metal salts as reactants, are those in the family of beta-aluminas, all of which exhibit a generic crystalline structure which is readily identifiable by x-ray diffraction. Thus, beta-type alumina or sodium beta-type alumina is a material which may be thought of as a series of layers of aluminum oxide ($Al_2O_3$) held apart by column of linear Al-O bond chains with sodium ions occupying sites between the aforementioned layers and columns. Numerous beta-type alumina polycrystalline materials exhibiting this generic crystalline structure are disclosed in the following U.S. Patents, the disclosures of which are incorporated herein by reference: 3,404,035; 3,404,036; 3,413,150; 3,446,667; 3,458,356; 3,468,709; 3,468,719; 3,475,220; 3,475,223; 3,475,225; 3,535,163; 3,719,531; and 3,811,943.

Among the numerous polycrystalline beta-type alumina materials disclosed in these patents and which may be processed in accordance with the method of this invention are the following:

1. Standard beta-type alumina which exhibits the above-discussed crystalline structure comprising a series of layers of aluminum oxide held apart by layers of linear Al-O bond chains with sodium ions occupying sites between the aforementioned layers and columns. As discussed in the aforementioned patents, beta-type alumina is formed from compositions comprising at least about 80% by weight, preferably at least about 85% by weight, of aluminum oxide and between about 5 and about 15 weight-percent, preferably between about 8 and about 11 weight-percent, of sodium oxide. There are two well known crystalline forms of beta-type alumina, both of which demonstrate the generic beta-type alumina crystalline structure discussed hereinbefore and both of which can easily be identified by their own characteristic x-ray diffraction pattern. β-alumina is one crystalline form which may be represented by the formula $Na_2O \cdot 11Al_2O_3$. The second crystalline form is β''-alumina which may be represented by the formula $Na_2O \cdot 6Al_2O_3$. It will be noted that the β'' crystalline form of beta-type alumina contains approximately twice as much soda (sodium oxide) per unit-weight of material as does the β-alumina. It is the β''-alumina crystalline structure which is preferred for the formation of solid electrolytes or reaction zone separators for electrical conversion devices. In fact, if the less desirable β form is present in appreciable quantities in the final ceramic, certain electrical properties of the body will be impaired.

2. Boron oxide $B_2O_3$ modified beta-type alumina wherein about 0.1 to about 1 weight-percent of boron oxide is added to the composition. This modification of the beta-type alumina is more thoroughly discussed in aforementioned U.S. Pat. No. 3,404,036.

3. Substituted beta-alumina wherein the sodium ions of the composition are replaced in part or in whole with other positive ions which are preferably alkaline metal ions.

4. Beta-type alumina which is modified by the addition of a minor proportion by weight of metal ions having a valence not greater than two (2) such that the modified beta-type alumina composition comprises a major proportion by weight of ions of aluminum and oxygen and a minor proportion by weight of metal ions in crystal lattice combination along with cations which migrate in relation to the crystal lattice as a result of an electric field, the preferred embodiment being wherein the metal ion having a valence not greater than two (2) is either lithium or magnesium or a combination of lithium and magnesium. These metals may be included in the composition in the form of lithium oxide or magnesium oxide or mixtures thereof in amounts ranging from about 0.1 to about 5 weight-percent, preferably from about 0.1 to about 1.5 weight-percent. This type of modified beta-type alumina is more thoroughly discussed in U.S. Pat. Nos. 3,475,255 and 3,535,163 mentioned above. Such lithia and magnesia-stabilized beta-alumina are preferred compositions for the preparation of beta-type alumina bodies demonstrating the β'' crystal structure. The beta-type aluminas most preferred for processing in accordance with this invention include lithium oxide as the modifier.

The energy conversion devices for which the dense polycrystalline β''-alumina containing bodies of this invention are particularly useful as reaction zone separators or solid electrolytes are disclosed in some detail in the aforementioned patents. In the operation of such energy conversion devices, the cations such as sodium in the β''-alumina, or some other cation which has been substituted for sodium in part or in whole, migrates in relation to the crystal lattice as a result of effects caused by an electric field. Thus, the solid ceramic electrolyte made by the process of this invention is particularly suited since it provides selective cationic communication between the anodic and cathodic reaction zones of the energy conversion devices and is essentially impermeable to the fluid reactants employed in the device when the reactants are in the elemental, compound or anionic state. Among the energy conversion devices in which the particular polycrystalline β''-alumina containing ceramics are useful are:

1. primary batteries employing electrochemically reactive oxidants and reductants in contact with and on opposite sides of the solid electrolyte or reaction zone separator;

2. secondary batteries employing molten, electrochemically reversably reactive oxidants and reductants in contact with and on opposite sides of the solid electrolyte or reaction zone separator;

3. thermoelectric generators wherein a temperature and pressure differential is maintained between anodic and cathodic reaction zones and/or between anode and cathode and a molten alkaline metal which is converted to ionic form, passed through the polycrystalline $\beta''$-alumina-containing ceramic wall or inorganic membrane and reconverted to elemental form; and 4. thermally regenerated fuel cells.

A review of the operation of such electrical conversion devices as disclosed in the aforementioned patents and detailed at length in the literature should make it clear that the conductive ceramic material employed in the preparation of these devices should have a low resistivity, preferably from about 3 to about 6 ohm-cm, and a strength as high as possible, preferably from about 20,000 psi to about 50,000 psi. Prior art techniques for the preparation of conductive beta-type alumina ceramic either produce materials of high strength and high resistivity or materials of low strength and low resistivity, depending upon the time and temperature of sintering. Those bodies which have been sintered at higher temperatures and for longer periods of time in order to lower the resistivities often tend to exhibit a duplex grain structure with grains ranging up to 150 micrometers or more in size. Such porosity and duplex grain structure have a deleterious effect on fracture strength, elastic modulus and fracture toughness of the sintered body. Those bodies which have been sintered at lower temperatures or for lower periods of time, on the other hand, while demonstrating a small grain size which is desirable for maintaining the strength of the body, do not exhibit the low resistivity which is desired, presumably because substantial amounts of $\beta$-alumina remain unconverted to the $\beta''$ crystalline form.

A technique has previously been developed wherein a rapid sintering step at temperatures between 1520° and 1650° C is followed by a prolonged (1–40 hours) thermal anneal at temperatures between about 1300° C and about 1500° C. In this process a low resistivity (less than 8 ohm-cm at 300° C preferably less than 5 ohm-cm) $\beta''$-$Al_2O_3$ ceramic with a much finer grain size (under about 10 micrometers) and a higher strength can be produced. The post-sintering heat treatment normally at a temperature lower than that used for sintering provides for a more complete conversion to $\beta''$-$Al_2O_3$ while at the same time prevents the occurrence of any deleterious grain growth. While this technique is an improvement over previous methods, it would be desirable to eliminate the need for the post-sintering heat soak from the point of view of increased production rates. The method disclosed and claimed in this application for preparing dense, high strength, polycrystalline ceramics exhibiting low resistivities obviates the deficiencies of prior art techniques.

BRIEF DESCRIPTION OF THE INVENTION

The invention briefly comprises three essential steps. First, fully converted $\beta''$-alumina seeds are produced. Second, a small quantity of these seeds is mixed with a 10–50 times larger quantity of a matrix powder of a composition consistent with the formation of $\beta''$-alumina upon sintering and a green ceramic body is formed from this mixture by isostatic pressing. Third, the said green ceramic body is sintered for less than 10 minutes, typically for 5 minutes, at about 1600° C in open air or under encapsulation in a noble metal envelope. The sintered ceramic body thereby obtained has such values of density, strength, grain size and electrical resistivity as would make it ideally suitable for use as a reaction zone separator or solid electrolyte in an energy conversion device.

The various embodiments of the method of this invention will be more fully understood from the detailed description of the invention.

The novel feature of this invention is that it eliminates the post-sintering annealing treatment. This novel feature is considered a marked improvement over the previous art techniques, especially from the viewpoint of enhanced industrial production rates.

DETAILED DESCRIPTION OF THE INVENTION

More specifically, the invention sought to be claimed in this application is a method for preparing a dense, strong, fine-grained polycrystalline $\beta''$-alumina-containing ceramic body exhibiting an electrical resistivity at 300° C of about 5 ohm-cm or less, wherein a small quantity of $\beta''$-alumina seed crystals can be used to effect the attainment of the desired end-properties in the ceramic bodies by subjecting their green forms to a sintering treatment only for a short period of time and thereby obviating the need for a prolonged annealing treatment.

The method of this invention comprises:

A. preparing fully converted $\beta''$-alumina seeds;

B. mixing a very small quantity of these seeds with a large quantity of a matrix powder of a composition consistent with the formation of $\beta''$-alumina upon sintering, and forming a green ceramic body by isostatically pressing the resultant powder mixture; and C. sintering the above-mentioned green ceramic body at temperatures of about 1600° C for less than 10 minutes; typically for 5 minutes, either by encapsulating the green body in a noble metal envelope or in an open-air atmosphere.

The sintering time and temperature schedules mentioned above are expected to be somewhat flexible, in that a shorter sintering time could be used by raising the sintering temperature; lower sintering temperature could be used if a longer sintering time period is acceptable. In either case, it is believed that no adverse effect on grain size would accrue.

For the preparation of the $\beta''$-alumina seeds, the sintering process followed by comminution has been used. However, any other process of making fully converted $\beta''$-alumina particles that does or does not involve sintering should yield equally effective seeds.

The mixing of the $\beta''$-alumina seeds with large quantities of matrix powders is accomplished in a variety of ways including the mechanical mixing of dry powders. The chemical composition of the seeds and of the matrix powders can be varied over a wide range, so long as it is compatible with the desired end-properties.

In the subsequent sections, the method of this invention is discussed and illustrated with examples relevant to the production of $\beta''$-alumina stabilized with less than one (1) percent by weight of lithium oxide. However, it is strongly believed that the method of this present invention will be of a far wider applicability, in that it could be utilized in the preparation of $\beta''$-alumina-containing ceramic bodies stabilized with magnesium oxide or magnesium and lithium oxides or in the preparation of sodium $\beta$-alumina-containing ceramic bodies, both pure and those modified with small amounts of boron oxide. These applications have been mentioned earlier.

In the examples cited later in this section, encapsulated green bodies are sintered usually in a molybdenum-wound resistance heating furnace with a closed-end alumina service tube. For open air sintering, a continuous pass-through furnace with molybdenum disilicide heating elements is used wherein the rate of heating to and cooling from the sintering temperature is precisely controlled.

The following specific examples will serve to illustrate the various embodiments of the method of this invention in great detail:

EXAMPLE 1

The matrix powder of a composition 8.7% $Na_2O$ – 0.7% $Li_2O$–90.6% $Al_2O_3$ is prepared from alpha alumina, sodium carbonate and lithium nitrate. The alpha alumina (e.g., Linde C or Meller) is first dried at 1000° C and stored in a desiccator after cooling inside the furnace. Heating to 1000° C is carried out in a large-muffle electrical resistance furnace, the alumina powder being contained in cast or recrystallized alumina crucibles. Sodium carbonate and lithium nitrate are dired in an oven at 280° C and 120° C respectively, and cooled and stored in a desiccator.

In order to prepare 100 grams of $\beta''$-alumina of the composition 8.7% $Na_2O$ – 0.7% $Li_2O$ – 90.690.6% $Al_2O_3$, the alpha alumina, sodium carbonate, and lithium nitrate are weighed out in the following quantities: alpha alumina - 90.6 grams; sodium carbonate - 14.88 grams; and lithium nitrate - 3.22 grams. These three ingredients in their respective amounts are mechanically mixed, and the mixture is contained in a loosely covered zirconia crucible; after which it is calcined at 1250° C for 2 hours. The calcined mixture is vibratory milled for 4 hours using high purity alumina cylindrical grinding media. The milled powder is used either as such or with an addition of a binder (polyvinylbutyral or stearic acid, 1 weight-percent).

The matrix powder thus made is utilized for making the $\beta''$-alumina seeds. Disc type specimens are pressed from the matrix powder (uniaxial pressing at 15,000 psi). These discs, 1 inch in diameter and about 1/16 inch to ⅛ inch thick, are bisque-fired around 700–800° C and then enclosed in a well-sealed platinum envelope. They are subsequently sintered at a temperature of 1600° C until large grains of $\beta''$-alumina are formed in the disc and can be observed clearly even without the aid of a microscope. The x-ray diffraction pattern of these discs show no perceptible peaks corresponding to other phases such as $\beta$-$Al_2O_3$, which is taken as an indication of complete conversion to $\beta''$-$Al_2O_3$. These fully converted, very coarse-grained $\beta''$-alumina discs are then crushed in a high-purity alumina mortar and pestle and then vibratory milled. The vibratory milling operation does not cause a detrimental amount of wear of the grinding media and no deleterious amounts of alumina chips are produced which would have a damaging influence on the efficacy of the powder being milled. The powder obtained after this milling is used as $\beta''$-alumina seeds.

Ten weight-percent of the $\beta''$-alumina seeds is added to the matrix powder described earlier by mixing in a paint-shaker. The powder mixture thus obtained is isostatically pressed into bars (2'' × ½'' × 5/16''). The bars are bisque fired in open air at 1000° C and slowly cooled down to room temperature, after which they are contained in a well-sealed platinum envelope. A platinum envelope usually contains equal numbers of bars made from the seeded matrix powder and from the unseeded matrix powder.

These are subsequently sintered at 1600° C for 5 minutes; and then slowly pulled out of the hot zone into cooler zones of the furnace. Finally the envelope is cooled to room temperature outside the furnace. Density, electrical resistivity (300° C), and grain size and morphology measurements are then made on the sintered bars. These are summarized in Table 1.

TABLE 1.

Sintering of Seeded and Unseeded $\beta''$-$Al_2O_3$
8.7% $Na_2O$ - 0.7% $Li_2O$ - 90.6% $Al_2O_3$

| Description | Unseeded Matrix Powder (~1μm) | Matrix Powder plus 10% $\beta''$-$Al_2O_3$ Seeds |
|---|---|---|
| Sintering temperature | 1600° C | 1600° C |
| Sintering time | 5 minutes | 5 minutes |
| Density (% theoretical, $\beta''$-$Al_2O_3$) | 98.4% | 95.5% |
| Resistivity (300° C) | 9.9 ohm-cm | 3.4 ohm-cm |
| Grain morphology | Duplex, elongated grains in fine-grained matrix | Competitive, uniform |
| Grain size | Large grains over 100μm | ~40μm |

EXAMPLE 2

The matrix powders were prepared using a 1μm alumina powder (e.g., Linde C) in one case and a 0.3μm alumina powder (e.g., Meller) in the other case. The method of preparing the matrix powders has already been described in Example 1, except that a calcination temperature of 1000° C is used for the 0.3μm alumina. Ten (10) weight-percent of the $\beta''$-alumina seeds are added to each of these two batches of the matrix powders and bar samples are isostatically pressed from the mixtures of the matrix powder and seeds. No platinum sheath is used for sintering these bars. The sintering is carried out in a continuous pass-through furnace in an open-air atmosphere. The sintered bars exhibit properties as listed in Table 2.

TABLE 2.

Effect of Seeding on Open-Air, Continuous Pass-Through Sintering
8.8% $Na_2O$, 0.75% $Li_2O$

| Calcined: 1000° C, 2 hours | | | 10% $\beta''$-$Al_2O_3$ Seeds, 0.3μm $Al_2O_3$ | | | |
|---|---|---|---|---|---|---|
| Sintering Temperature (° C) | Hot Zone Length (in) | Velocity (in/min) | Sintering Time (min) | Density (g/cc) | Density (% theor.) | Resistivity (ohm-cm, 300° C) |
| 1603 | 4.8 | 0.58 | 8.3* | 3.11 | 95.4 | 4.1 |
| 1600** | 4.8 | 1.10 | 4.5* | 3.12 | 95.8 | 2.5 |

*Uniform microstructure ~25μm grain size.
**1μm $Al_2O_3$ powder; 1250° C calcine.

EXAMPLE 3

The matrix powders of various contents of sodium oxide and lithium oxide are prepared using the method described in Example 1, using a 0.3$\mu$m alpha alumina powder (e.g., Meller). Various amounts of the $\beta''$-alumina seeds are added to these matrix powders and bar-type specimens are isostatically pressed from their mixtures. Sintering under platinum encapsulation with different time and temperature schedules give results as listed in Table 3. It is clear that seeding eliminates the need for a post-annealing treatment and the grain size is controlled. It is also noticed that as low as 2 weight-percent of seeds effectively reduces the electrical resistivity and it is believed that even smaller seed contents can be used. In this example, relatively large seeds were used; typically varying in size from 30 micrometers to 100 micrometers.

TABLE 3.

Effect of Seed Content on Resistivity and Sintered Density

| Wt% Seeds | Sintering Conditions 1600° C, 5 min* | | 1585° C, 5 min** | | 1585° C, 15 min*** | |
|---|---|---|---|---|---|---|
| | Density (%) | Resistivity (ohm-cm-300° C) | Density (%) | Resistivity (ohm-cm-300° C) | Density (%) | Resistivity (ohm-cm-300° C) |
| Unseeded | 95.3 | 16.2 | 98.9 | 15.5**** | 97.6 | 14.7 |
| 2.0 | 95.2 | 4.4 | 95.5 | 4.7***** | 97.5 | 6.8 |
| 5.0 | 94.7 | 3.9 | — | — | 95.9 | 6.6 |
| 10.0 | 93.3 | 5.0 | — | — | 94.2 | 5.3 |

*8.9% $Na_2O$ - 0.7% $Li_2O$ (1250° C calcine - 2 hours).
**9.4% $Na_2O$ - 0.9% $Li_2O$ (1000° C calcine - 2 hours).
***9.2% $Na_2O$ - 0.7% $Li_2O$ (1000° C calcine - 2 hours).
****23,500 psi fracture strength.
*****21,000 psi fracture strength.

EXAMPLE 4

The matrix powder is prepared using Meller brand alumina and a calcination temperature of 1000° C. Fine $\beta''$ alumina seeds (smaller than 5 micrometers) are used in an amount of 2 weight-percent. These are obtained by sedimentation of ground seeds in isopropyl alcohol. Bars are isostatically pressed from both the matrix powder and from the mixture of matrix powder and these fine seeds. Sintering is carried out under platinum encapsulation at 1590° C for 5 minutes. The resultant properties are summarized in Table 4. What is most notable is that while both the seeded and unseeded bars reached essentially the same density, there is a striking difference between their electrical resistivities and microstructures.

TABLE 4.

Sintering of Seeded and Unseeded $\beta''$-Alumina
9.1% $Na_2O$ - 0.75% $Li_2O$ - 90.15% $Al_2O_3$
Seed size: Less than 5 micrometers
Sintering temperature: 1590° C
Sintering time: 5 minutes

| | Density (% theoretical) | Resistivity (Ω-cm) | Grain Size (μm) |
|---|---|---|---|
| Unseeded | 97.3 | 16.5 | 140 Few isolated grains |
| Seeded | 97.0 | 5.8 | 40 Competitive, uniform |

We claim:

1. In a process for forming a $\beta''$-alumina containing ceramic body comprising A. forming a green ceramic body from a matrix powder which is of a composition consistent with the formation of $\beta''$-alumina upon sintering and B. sintering said green ceramic body at a temperature and for a time necessary to achieve the desired final density and convert said composition to $\beta''$-alumina, the improvement comprising mechanically mixing said matrix powder, with $\beta''$-alumina seed crystals prior to forming said green ceramic body, said seed crystals having a particle size up to 100 micrometers, the amount of said crystals ranging up to 50% by weight of said total mixture of seed crystals and matrix powder.

2. A process in accordance with claim 1 wherein said seed crystals are formed by sintering a body formed from the same composition as said matrix powder and comminuting the sintered $\beta''$-alumina body to the desired particle size.

3. A process in accordance with claim 1 wherein said $\beta''$-alumina seed crystals are admixed with said matrix powder in an amount ranging up to 10 weight percent of the mixture.

4. A process in accordance with claim 1 wherein said $\beta''$-alumina seed crystals are admixed with said matrix pwoder in an amount ranging from about 2 up to about 10 weight percent of the mixture.

* * * * *